United States Patent
Mitterreiter et al.

(10) Patent No.: US 7,472,281 B2
(45) Date of Patent: Dec. 30, 2008

(54) METHOD FOR THE AUTOMATIC LOG-IN OF A SUBSCRIBER STATION SITUATED PARTICULARLY IN A MOTOR VEHICLE IN AN EXTERNAL INFORMATION SYSTEM

(75) Inventors: Iise Mitterreiter, Unterhaching (DE); Thomas Diessel, Ottobrunn (DE); Thorsten Lange, Hamburg (DE); Josef Meis, Muenster (DE); Horst-Dieter Sauren, Duesseldorf (DE); Michael Fischer, Muecke (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 954 days.

(21) Appl. No.: 10/670,420

(22) Filed: Sep. 26, 2003

(65) Prior Publication Data
US 2004/0073562 A1 Apr. 15, 2004

Related U.S. Application Data

(63) Continuation of application No. PCT/EP02/08965, filed on Aug. 9, 2002.

(30) Foreign Application Priority Data
Aug. 20, 2001 (DE) .................................. 101 39 888

(51) Int. Cl.
*H04K 1/00* (2006.01)
*H04L 9/00* (2006.01)
*G06F 7/04* (2006.01)

(52) U.S. Cl. ........................ 713/182; 713/183; 713/184; 726/26

(58) Field of Classification Search .................. 713/182, 713/183, 184; 726/26
See application file for complete search history.

(56) References Cited

U.S. PATENT DOCUMENTS

| | | | | |
|---|---|---|---|---|
| 5,613,012 A * | 3/1997 | Hoffman et al. | ............ | 382/115 |
| 5,668,876 A * | 9/1997 | Falk et al. | .................. | 380/271 |
| 5,838,812 A * | 11/1998 | Pare et al. | ................... | 382/115 |
| 6,108,591 A | 8/2000 | Segal et al. | .................... | 701/1 |
| 6,877,095 B1 * | 4/2005 | Allen | ......................... | 713/182 |

* cited by examiner

*Primary Examiner*—Nasser Moazzami
*Assistant Examiner*—Mohammad W Reza
(74) *Attorney, Agent, or Firm*—Crowell & Moring LLP

(57) ABSTRACT

In a method for the automatic log-in of a subscriber station in a motor vehicle into an external information system, a non-automatic log-in is first performed by transmitting to the external information system a subscriber identification, a pertaining password and a station identification. The automatic log-in for the subscriber identification is activated by transmitting a corresponding request from the subscriber station to the external information system, establishing a secret code for the subscriber identification in the external information system, and transmitting the secret code in a hidden manner to the subscriber station. The secret code is stored in a hidden manner in the subscriber station. An automatic log-in of the subscriber station into the external information system is implemented by transmitting to the external information system the subscriber identification without the password, the station identification and transmitting the code in a hidden manner.

12 Claims, 5 Drawing Sheets

UL

| UNR | UNA | PW | VIN | AUTO - L |
|-----|-----|-----|-----|-----|
| 1 | U1 | P1 | VIN 1<br>VIN 3 | (VIN 1, VIN 1 - RN)<br>– |
| 2 | U2 | P2 | VIN 2 | (VIN 2, VIN 2 - RN) |
| 3 | U3 | P3 | VIN 1<br>VIN 2<br>VIN 3 | –<br>–<br>(VIN 3, VIN 3 - RN) |

FIG 2

METHOD FOR THE AUTOMATIC LOG-IN OF A SUBSCRIBER STATION SITUATED PARTICULARLY IN A MOTOR VEHICLE IN AN EXTERNAL INFORMATION SYSTEM

BACKGROUND AND SUMMARY OF THE INVENTION

The present application is a continuation of international patent application no. PCT/EP02/08965, filed Aug. 09, 2002, designating the United States of America, the entire disclosure of which is incorporated herein by reference. Priority is claimed based on German patent application 101 39 888.3, filed Aug. 20, 2001.

The present invention relates to a method for automatically logging in a subscriber station situated in an external information system, such as a motor vehicle.

Although, in principle, the invention is applicable to any subscriber stations, it is explained herein with respect to a log-in of a subscriber station situated in a motor vehicle, via a radio communications network in an external server of the automobile manufacturer, also called a "portal".

A log-in (sometimes also called log-on) is the process of starting a session of a subscriber in an information system or data processing system, including the input of a subscriber identification and a password, as well as of the checking of an access authorization by the system (referred to as authentication).

In a motor vehicle, it may be very inconvenient for a user to have to input his or her password each time, when starting a browser situated with the subscriber station contained in the motor vehicle.

For subscriber identification, it is customary to present to the user a menu of valid subscriber identifications on a video screen, so that he or she can input the desired subscriber identification by pressing a button, without having to input the different characters that comprise the subscriber identification. This technique is particularly useful in a motor vehicle because input devices of the subscriber stations typically are not equipped with a keyboard, but only a joystick or a rocker, with relatively few direct functions.

As a rule, security is impaired by an automatic log-in. However, in a motor vehicle, this concern is not as critical as in a publicly accessible system because, in order to enter the motor vehicle the user must first pass through a security system which is normally equipped with a key code. To this extent, access to the motor vehicle is limited, and the security requirements regarding access to the vehicle are greater than those applicable to access to the browser, because the vehicle itself has a very high value. Thus, in principle, an automatic log-in can be tolerated for a subscriber station situated in a motor vehicle.

One object of the present invention is therefore to provide a method for automatic log-in of a vehicle borne subscriber station into an external information system, which method is easily implemented, and at the same time offers at least a certain minimum degree of security.

This and objects and advantages are achieved by the log-in method according to the invention, in which, after a corresponding activation of the system, an automatic log-in of the subscriber station in the external information system can be carried out by transmitting only the subscriber identification and a closed code, but without a password.

According to a preferred further embodiment of the invention, to activate an automatic log-in, a non-automatic log-in of the subscriber station into the external information system is performed while the subscriber identification, the pertaining passwords and the station identification are transmitted to the external information system. The access request is transmitted in the logged-in condition.

According to a further embodiment of the invention, the subscriber station is situated in a motor vehicle and communicates with the external information system by way of a radio communications network.

According to another embodiment, the station identification contains a vehicle-specific parameter, particularly a vehicle identification number.

According to another embodiment, only a single code is established for each station identification.

According to still another embodiment, during the activating of the automatic log-in in the external information system, a subscriber list is entered, containing the corresponding subscriber identification with the station identification and the pertaining code for the automatic log-in.

According to a further embodiment, the external information system has a list with admissible subscriber identifications for a respective station identification.

According to a further embodiment, in the case of a log-in request of the subscriber station, the external information system transmits the list with the admissible subscriber identifications, the list being visually indicated at the subscriber station.

According to another embodiment, a cancel request for the subscriber identification is provided which deactivates the automatic log-in for the respectively used subscriber station.

According to yet another embodiment, a cancel request for the subscriber identification is provided which deactivates the automatic log-in for each subscriber station.

According to still another embodiment, the secret code has a succession of a plurality of characters which are defined in a predetermined value range.

In a further embodiment of the invention, the secret code is generated by a random process in the external information system.

In yet a further embodiment, in the event of an attempt of an automatic log-in with the transmission of the subscriber identification without the password, the station identification and the hidden transmission of a false code to the external information system, the automatic log-in is deactivated for each subscriber station.

Other objects, advantages and novel features of the present invention will become apparent from the following detailed description of the invention when considered in conjunction with the accompanying drawings.

BRIEF DESCRIPTION OF THE DRAWINGS

FIG. 2 is a more detailed view of a subscriber list that is stored in the external information system in an embodiment of the method according to the invention;

DETAILED DESCRIPTION OF THE DRAWINGS

Figure 1:
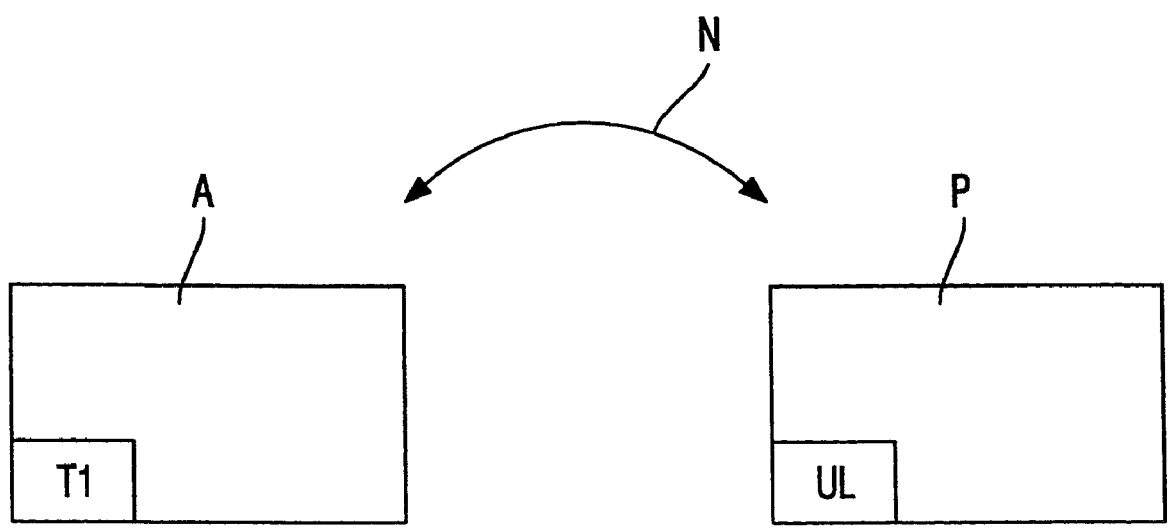
FIG. 1 is a schematic view of a system in which the method for an automatic log-in according to the invention can be used.

FIG. 1 is a schematic view of a system in which the method according to the invention for an automatic log-in can be used. Reference symbol A indicates a motor vehicle to which access is secured by a conventional key code system. A subscriber station T1 situated on the vehicle can be operated by the user of the motor vehicle by means of an operating device, such as a joystick or a rocker. The subscriber station T1 contains a browser which controls its operation and its external contacts.

By means of the browser, the subscriber station T1 can contact an external information system P, for example, in the form of a server of the automobile manufacturer (also called a portal). Such contact can take place, for example, by a radio communications network N, such as the GSM radio communications network.

In order to avoid an unauthorized excess to the external information system, the external information system P contains a subscriber list UL, which has corresponding authorization data and access data for all authorized subscribers. The authorization data specify, among other things, which specific functions a subscriber can carry out, and the access data specify the data that the browser must transmit to the subscriber station T1, to establish a connection at all.

FIG. 2 is a detailed view of the subscriber list UL stored in the external information system P. To simplify the explanation, only a portion of the subscriber list for the first three subscribers is shown in the present example. Users of the system are designated by consecutively assigned numbers UNR contained in the first column from the left; alternatively, the actual subscriber name or another provisional substitute may be used instead of the subscriber number. The second column UNA contains for each subscriber U1, U2, U3, which the subscriber must transmit via the browser of the subscriber station T1 to the external information system P in order to access the latter. For a conventional non-automatic log-in, a corresponding password PW must also transmitted to the external information system P so that the access is opened up. This password PW is indicated in the third column from the left for the respective subscriber; here, as P1, P2, P3.

The fourth column contains a so-called station identification VIN. In the present case, this station identification is a vehicle-specific parameter (specifically a vehicle identification number), which indicates to the external information system P the vehicle from which the corresponding subscriber wants to have access. For this purpose, during each log-in attempt, the parameter VIN is automatically transmitted from the subscriber station T1 via the browser to the external information system P, normally in a hidden manner; that is, without being displayed to the user of the subscriber station T1.

As illustrated in the corresponding column in FIG. 2, several station identifications VIN can be assigned to a subscriber; for example, for a first vehicle, second vehicle, third vehicle, etc. Thus, in the present example, the user No. 1 has an access authorization for the vehicles with the station identifications VIN1 and VIN3; while User No. 2 has an access authorization only for the vehicle with the station identification VIN2; and User No. 3 has access authorizations for the vehicles with the position identifications VIN1, VIN2 and VIN3.

According to the invention, the right-hand column of the subscriber list UL, designated as named AUTO-L, indicates whether an automatic log-in is setup for the corresponding subscriber in the respective admissible vehicle, and also contains a secret code which, in the case of an automatic log-in, is to be transmitted in a hidden manner from the concerned vehicle to the external information system P, so that the automatic log-in is actually carried out.

The significance of this special code, designated as VIN1-RN, VIN2-RN and VIN3-RN respectively, is that, even if the station identification VIN is falsified, unauthorized access to the external information system P is impossible because the secret code, which is to be transmitted in a hidden manner, is not known or cannot be determined. For this purpose, the secret code can be generated purely based on software and in a random manner and can be stored in memory regions which are not externally accessible.

Figure 3A:
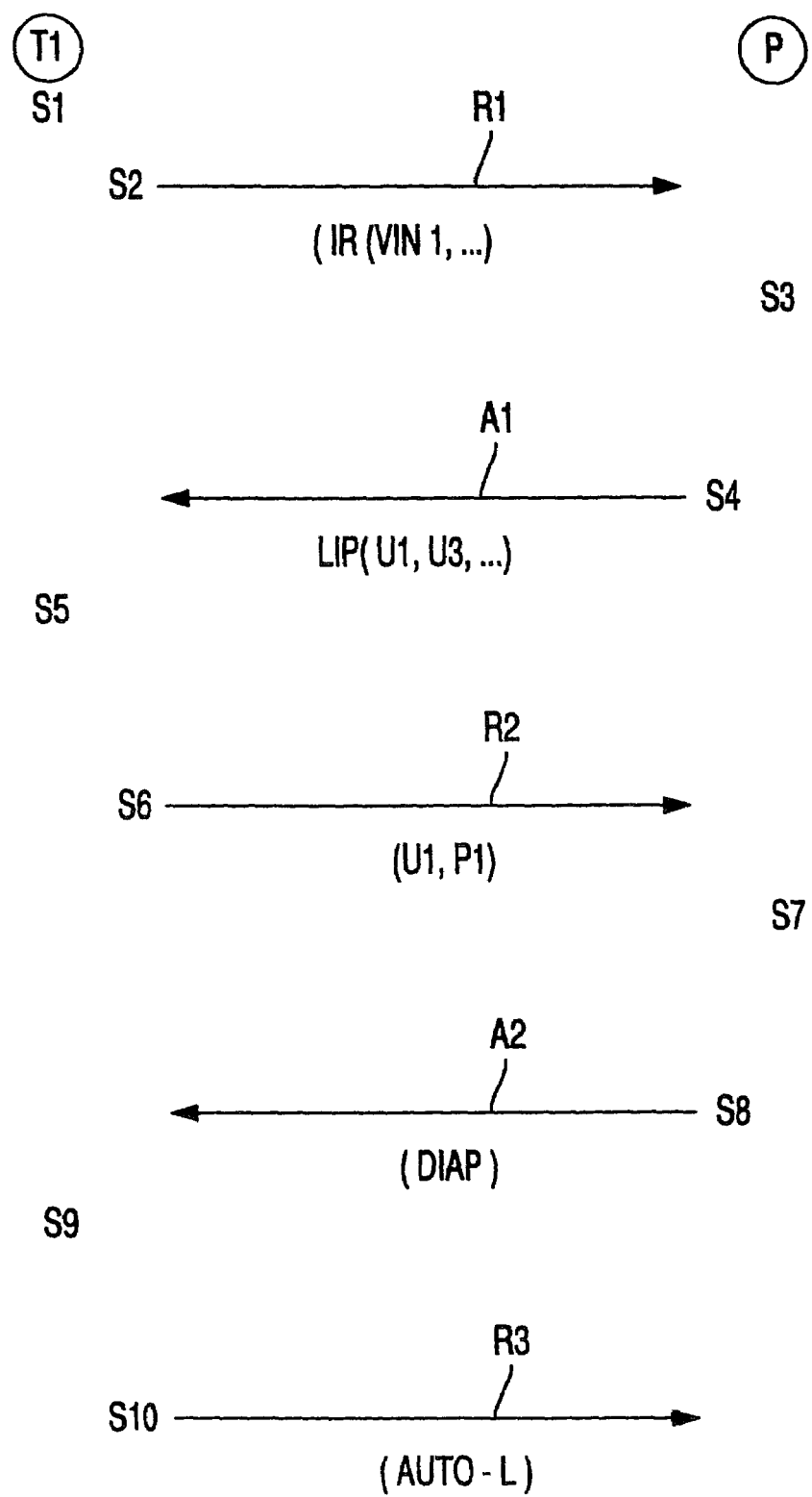
FIGS. 3A and 3B illustrate the process steps for activating automatic log-in according to the invention.
Figure 3B:
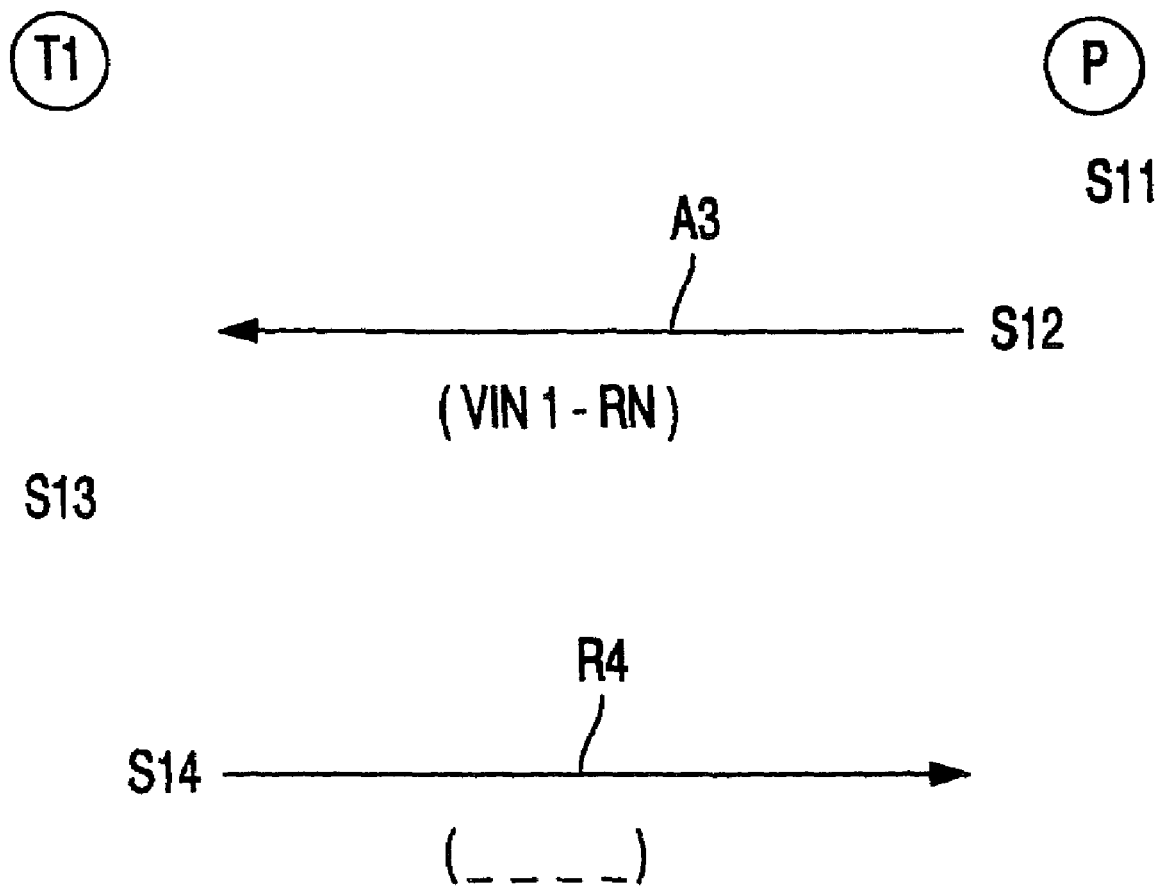

FIGS. 3A and 3B show a sequence of process steps for activating automatic log-in according to the present invention. The process steps S1 to S14 are carried out at the subscriber station T1 (to the left) or at the external information system P (to the right). Respective connection arrows between the subscriber station T1 and the external information system P indicate messages that are exchanged between the two units via the radio communications network N.

In a first step S1, the subscriber or user enters the motor vehicle A and switches on the subscriber station T1, activating the browser installed thereon, for example, by activating the ignition lock or a special on/off switch. Subsequently, in a second step S2, the subscriber station T1 sends a first request R1 by way of the radio communications network N (here, the GSM network, which is activated simultaneously) to the external information system P. The request R1 contains an access data set AR containing, among other things, the station identification VIN1 of the subscriber station T1 in the motor vehicle A, so that the external information system P can easily detect from where the request R1 is coming.

In a third step S3, the external information system P checks whether valid subscribers are provided for the station identification VIN1. In the present case, the subscribers with the subscriber identification U1 and U3 are provided for the station identification VIN1, as indicated directly in the subscriber list according to FIG. 2.

In a next step S4, the external information system P sends a response A1 to the subscriber station T1, including a so-called log-in page LIP, in which the admissible subscriber identifications U1,U3 are transmitted directly to the subscriber station T1 and offered there for the selection by the user on a display unit (not shown).

In a further step S5, the user inputs by way of the input unit of the subscriber station T1 the desired subscriber identification, here U1, together with the corresponding password P1;and in a step S6, the subscriber station T1 sends this data set (optionally together with additional data) in a request R2 to the external information system.

In a subsequent step S7, the external information system P checks whether the password P1 for the subscriber identification U1 is correct. If not so, the process is, for example, terminated or jumps back to step S4. Since, in the present case, the password P1 is part of the subscriber identification U1, in the subsequent step S8, the external information system P sends a dialog page DlAP in a second response A2 to the subscriber station T1.

Generally, the dialog page DlAP contains a fairly large number of input options or possibilities among which the user can select the option which seems appropriate to him. In the present case, it will be assumed that the activation of an automatic log-in represents one of the options.

In step S9, the user selects this option of activating the automatic log-in; and in step S10, a corresponding third request R3 with the corresponding parameter AUTO-L is sent to the external information system P.

In the subsequent step S11, the external information system, in the column AUTO-L, generates the input (VIN1, VIN1-RN) illustrated in FIG. 2 for the subscriber No. 1 in connection with the station identification VIN1. As explained above, this input indicates that the automatic log-in is activated for this user and this station identification and simultaneously a random code VIN1-RN is thereby generated which, as explained below, has to be transmitted together with a request for an automatic log-in by the concerned subscriber station, so that an automatic log-in can, in fact, be carried out.

The code VIN1-RN is a string of characters (for example, 10 to 20), which may be limited to a certain value range in order to increase security. For example, certain string values may be excluded from the start, or the string values may be limited to a certain size range.

In the subsequent step S12, the external information system P sends the generated VIN1-RN code in a hidden manner in the response A3 to the subscriber station T1. In other words, the user of the subscriber station T1 is aware of neither the transmission of the secret code nor the value thereof. After the receipt of the secret VIN1-RN code in the subscriber station T1, the latter is stored in step S13 in an inaccessible memory region and is available there for future requests.

In this context, it is possible to attach this code to any future request or only to special requests which have as their object, for example, an automatic log-in or a change of the log-in status.

After a successful activation of the automatic log-in, the user of the subscriber station T1, in a request R4, can select any other option of the dialog page DlAP and send this option to the external information system P for a response or for processing.

Figure 4:
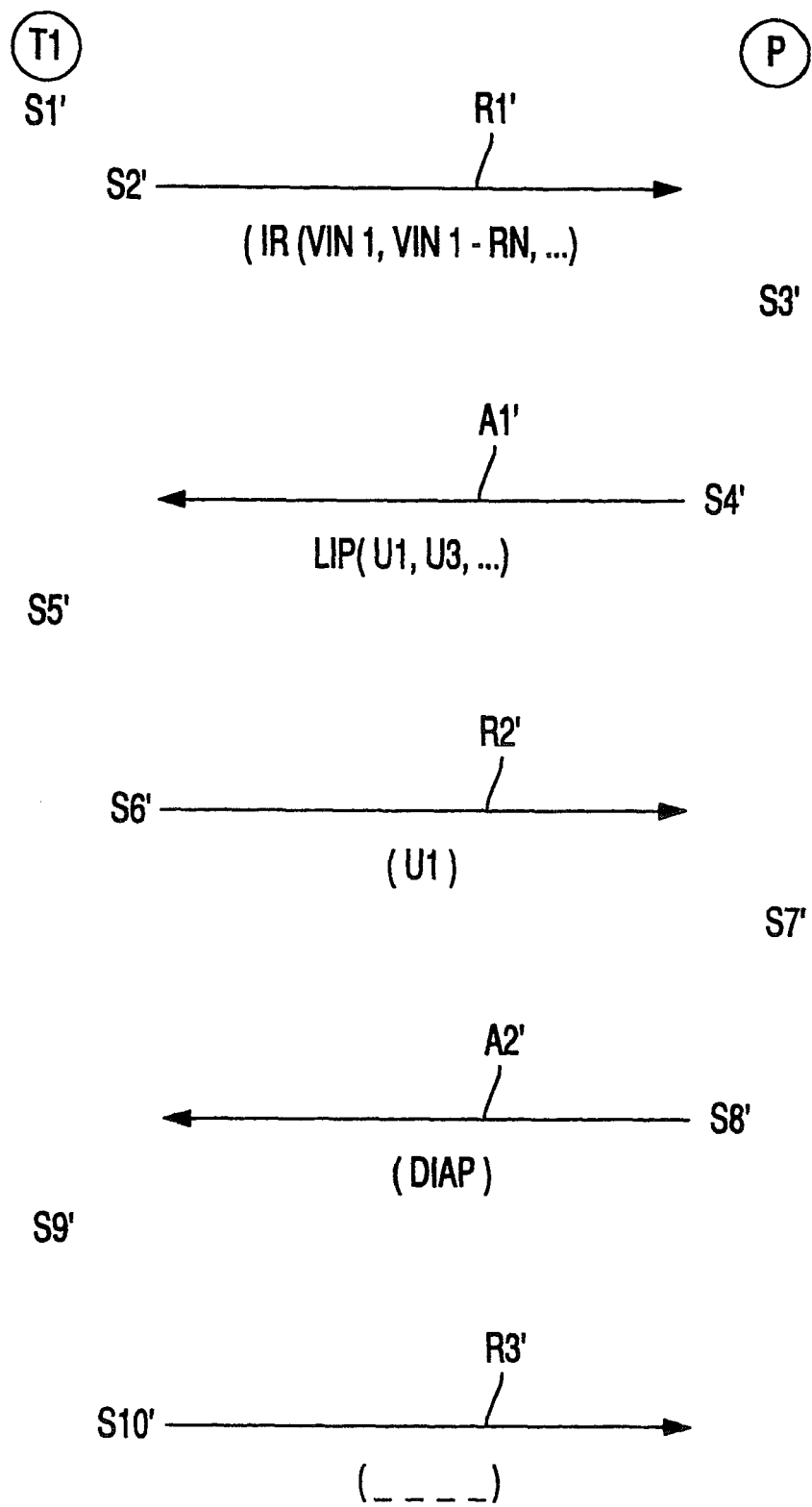
FIG. 4 shows the process steps for an automatic log-in, after automatic log-in has been activated.

FIG. 4 is a representation of the process steps for an automatic log-in, after automatic log-in has been activated.

In step S1', analogous to step S1 according to FIG. 3, the subscriber station T1 is switched on by the user and the browser is started. In step S2', a request R1' with the access data set is automatically sent from the subscriber station T1 to the external information system P; in this case, in addition to the station identification VIN1, the access data set includes the. secret hidden code VIN1-RN. It should be noted in this regard that, if secret code VIN1-RN is absent (as, for example, in the case of a first log-in), the corresponding field of the access data set may be vacant or contain a certain value which points to the absence of this secret code.

In a subsequent step S3', the external information system P checks the received data set, particularly the parameters VIN1, VIN1-RN, by means of the subscriber list UL according to FIG. 2, and determines, among other things, that an input is present in the corresponding field of the subscriber list UL, whereupon the decision is made that the automatic log-in is permissible. In the subsequent step S4', the external information system P sends a corresponding log-in page LIP in a first response A1' to the subscriber station T1, wherein, among other things, the permissible subscriber identifications U1, U3 are listed which are indicated on the display unit of the subscriber station T1.

Because of the implemented activation of the automatic log-in, a supplement can be added to the subscriber identification U1, which supplement prevents the user of the subscriber station T1 from being asked on the log-in page LIP to input the password after he has decided on the subscriber identification U1. Correspondingly, a supplement can also be added to the subscriber identification U3 which indicates that, in the case of a decision on this subscriber identification, the password should definitely be requested on the log-in page to be displayed.

In the present case, the user decides in step S5' on the user identification U1 specifically on that user identification for which the automatic log-in is installed. For this reason, the browser does not ask the user for the password P1; rather immediately after the decision on the subscriber identification U1, it transmits the subscriber identification U1 in a second request R2' to the external information system p. In step S7', the external information system P decides that the automatic log-in is permissible and successful and, in step S8', sends a corresponding second response A2' with the already introduced dialog page DlAP to the subscriber station T1.

As described in connection with FIG. 3, in step S9', the user decides on a certain option of the dialog page DlAP and, by means of his browser, sends in step S10' a corresponding parameter in a request R3' for a processing or responding to the external information system P.

Naturally, the dialog page DlAP must also contain an option for the deactivation of the automatic log-in. In this context, it is expedient to introduce two different suboptions for the deactivation of the automatic log-in, specifically, a first suboption, in which automatic log-in is deactivated only for the corresponding motor vehicle (in the case of the above example, for the motor vehicle A with the station identification VIN1), as well as a second suboption in which the automatic log-in is removed for all vehicles registered and approved for the corresponding user.

In contrast to the above-illustrated example, it is possible that no only a general code for securing the automatic log-in is assigned to a subscriber station but a different secret code for each user.

The above-described dialog is of course only used as example. Thus, the portion of the dialog for activating the automatic log-in may run by way of a different network than the radio communications network N or may run outside a normal session with a non-automatic log-in. Also, the secret code does not necessarily have to be a random code; rather it may, for example, be generated according to a predetermined algorithm from the station identification or in another manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a subscriber station log-in into an external information system comprising:
   initially performing a non-automatic log-in by transmitting to said external information system a subscriber identification, an associated password and a station identification that is automatically transmitted to said external information system;
   transmitting a request from the subscriber station to the external information system for activating the automatic log-in for a particular subscriber identification;
   establishing a secret code for the particular subscriber identification in the external information system and transmitting the secret code in a hidden manner to the subscriber station;
   storing the secret code in a hidden manner in the subscriber station; and
   thereafter transmitting from the subscriber station to the external information system in a hidden manner the particular subscriber identification without the password, the station identification and the secret code to implement the automatic log-in of the subscriber stations in all subsequent log-ins until canceled.

2. The method according to claim 1, wherein the subscriber station is situated in a motor vehicle and communicates with the external information system by way of a radio communications network.

3. The method according to claim 1, wherein the station identification contains a vehicle-specific parameter.

4. The method according to claim 1, wherein a single code is established for each station identification.

5. The method according to claim 1, wherein during activation of the automatic log-in in the external information system, an input is established in a subscriber list for a corresponding subscriber identification with the station identification and the pertaining code for the automatic log-in.

6. The method according to claim 1, wherein the external information system has a list of permissible subscriber identifications for each respective station identification.

7. The method according to claim 6, wherein during a log-in request of the subscriber station, the external information system transmits the list of permissible subscriber identifications and visually indicates the list at the subscriber station.

8. The method according to claim 1, wherein a cancel request for the subscriber identification is provided which deactivates the automatic log-in for a particular used subscriber station.

9. The method according to claim 1, wherein a cancel request for the subscriber identification is provided which deactivates the automatic log-in for each subscriber station.

10. The method according to claim 1, wherein the secret code has a sequence of characters that are defined within a predetermined value range.

11. The method according to claim 1, wherein the secret code is generated by a random process in the external information system.

12. The method according to claim 1, wherein during an attempted automatic log-in, including transmission of an incorrect code to the external information system, the automatic log-in for each subscriber station is deactivated.

* * * * *